United States Patent
Iino et al.

(10) Patent No.: US 11,513,082 B2
(45) Date of Patent: Nov. 29, 2022

(54) FOREIGN SUBSTANCE INSPECTION APPARATUS AND FOREIGN SUBSTANCE INSPECTION METHOD

(71) Applicant: CANON KABUSHIKI KAISHA, Tokyo (JP)

(72) Inventors: Masayoshi Iino, Utsunomiya (JP); Hiroki Nakano, Utsunomiya (JP); Yasuhiro Yazawa, Haga-gun (JP); Kohei Maeda, Utsunomiya (JP); Daisuke Nakajima, Shimotsuke (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 245 days.

(21) Appl. No.: 17/061,893

(22) Filed: Oct. 2, 2020

(65) Prior Publication Data
US 2021/0109036 A1  Apr. 15, 2021

(30) Foreign Application Priority Data

Oct. 15, 2019 (JP) .............................. JP2019-188863

(51) Int. Cl.
*G01N 21/88* (2006.01)
*G01N 21/956* (2006.01)
(Continued)

(52) U.S. Cl.
CPC ....... *G01N 21/956* (2013.01); *G01N 21/8806* (2013.01); *G01N 21/8851* (2013.01);
(Continued)

(58) Field of Classification Search
CPC ............ G01N 21/956; G01N 21/8806; G01N 21/8851; G01N 21/94; G01N 2021/1765;
(Continued)

(56) References Cited

U.S. PATENT DOCUMENTS 5,774,222 A * 6/1998 Maeda ............... G01N 21/8806
250/548
6,400,454 B1 * 6/2002 Noguchi ............ G01N 21/9501
356/237.4
6,888,958 B1 * 5/2005 Sawa ........................ G06T 7/32
382/209
(Continued)

FOREIGN PATENT DOCUMENTS

JP       H07260701 A     10/1995
TW       201007346 A      2/2010
(Continued)

OTHER PUBLICATIONS

Office Action issued by Taiwanese Appln. No. 109133589 dated Sep. 27, 2022. English translation provided.

*Primary Examiner* — Isiaka O Akanbi
(74) *Attorney, Agent, or Firm* — Rossi, Kimms & McDowell LLP (57) ABSTRACT

Apparatus inspects the presence/absence of foreign substance on object having inspection region and non-inspection region arranged outside the inspection region. The apparatus includes sensor for illuminating the object and output, as image, result acquired by detecting light from region including the inspection region, and processor for detecting foreign substance based on inspection region image acquired by excluding non-inspection region image, which is image of the non-inspection region, from the image output from the sensor. The non-inspection region image includes first part generated by light from predetermined part of the non-inspection region of the inspected object and second part whose pixel value is continuous from pixel value of the first part and the processor specifies the second part based on fact that the pixel value of the second part is continuous from that of the first part.

10 Claims, 11 Drawing Sheets

(51) Int. Cl.
*G06T 7/13* (2017.01)
*G06T 7/00* (2017.01)
*G01N 21/94* (2006.01)
*G06T 7/11* (2017.01)
*G01N 21/17* (2006.01)

(52) U.S. Cl.
CPC .......... *G01N 21/94* (2013.01); *G06T 7/0004* (2013.01); *G06T 7/11* (2017.01); *G06T 7/13* (2017.01); *G01N 2021/1765* (2013.01); *G01N 2021/8887* (2013.01); *G01N 2021/95676* (2013.01)

(58) Field of Classification Search
CPC .......... G01N 2021/8887; G01N 2021/95676; G01N 2021/945; G01N 2021/8809; G01N 2021/8893; G06T 7/0004; G06T 7/11; G06T 7/13
USPC ............................................ 356/237.2–237.6
See application file for complete search history.

(56) References Cited

U.S. PATENT DOCUMENTS

| | | | | |
|---|---|---|---|---|
| 2002/0181756 | A1* | 12/2002 | Shibuya | G01N 21/956 356/237.4 |
| 2004/0012775 | A1* | 1/2004 | Kinney | G01N 21/9501 356/237.2 |
| 2004/0064269 | A1* | 4/2004 | Shibuya | G06T 7/0004 702/40 |
| 2006/0273267 | A1* | 12/2006 | Maeda | G03F 7/70725 250/548 |
| 2013/0301042 | A1* | 11/2013 | Urano | G01B 11/0608 356/237.5 |
| 2016/0018340 | A1* | 1/2016 | Otani | G01N 21/8851 356/237.2 |

FOREIGN PATENT DOCUMENTS

| | | |
|---|---|---|
| TW | 201435333 A | 9/2014 |
| TW | 201805620 A | 2/2018 |

* cited by examiner

■ A: FIRST PART
▨ B: SECOND PART

■ A: FIRST PART
▨ B: SECOND PART

FOREIGN SUBSTANCE INSPECTION APPARATUS AND FOREIGN SUBSTANCE INSPECTION METHOD

BACKGROUND OF THE INVENTION

Field of the Invention

The present invention relates to a foreign substance inspection apparatus and a foreign substance inspection method.

Description of the Related Art

In the manufacturing of devices such as semiconductor devices, display devices, and the like, an exposure apparatus that transfers a pattern of an original onto a photoresist film on a substrate can be used. If a foreign substance adheres to the original, the foreign substance is transferred to a photoresist film and can cause a defect in the device. Hence, a foreign substance inspection apparatus can be used to inspect a foreign substance that has adhered to an original.

An original can be conveyed to a foreign substance inspection apparatus by a conveyance robot. Although the conveyance robot aligns the original with respect to the foreign substance inspection apparatus, a frame (for example, a pellicle frame) arranged on the original can be detected as a foreign substance if the alignment accuracy is low. Alternatively, the foreign substance inspection apparatus may include an alignment mechanism, but the frame arranged on the original can be detected as a foreign substance if the alignment accuracy is low in this case as well. Hence, the foreign substance inspection target region can be set to be a region which is sufficiently away from the inner edge of the frame in accordance with the alignment accuracy of the original. However, in this case, a region near the frame will be excluded from the inspection target region and will not be detected even if a foreign substance is present.

SUMMARY OF THE INVENTION

An aspect of the present invention is to provide a technique advantageous in detecting a foreign substance, which has adhered to an inspected object, over a wide range even in a case in which the alignment accuracy of the inspected object is low.

One of aspects of the present invention provides a foreign substance inspection apparatus that inspects the presence/absence of a foreign substance on an inspected object which includes an inspection region and a non-inspection region arranged outside the inspection region, the apparatus comprising: a sensor configured to illuminate the inspected object and output, as an image, a result acquired by detecting light from a region including the inspection region; and a processor configured to detect a foreign substance based on an inspection region image acquired by excluding a non-inspection region image, which is an image of the non-inspection region, from the image output from the sensor, wherein the non-inspection region image includes a first part generated by light from a predetermined part of the non-inspection region of the inspected object and a second part whose pixel value is continuous from a pixel value of the first part, and the processor specifies the second part based on a fact that the pixel value of the second part is continuous from the pixel value of the first part.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Figure 1:
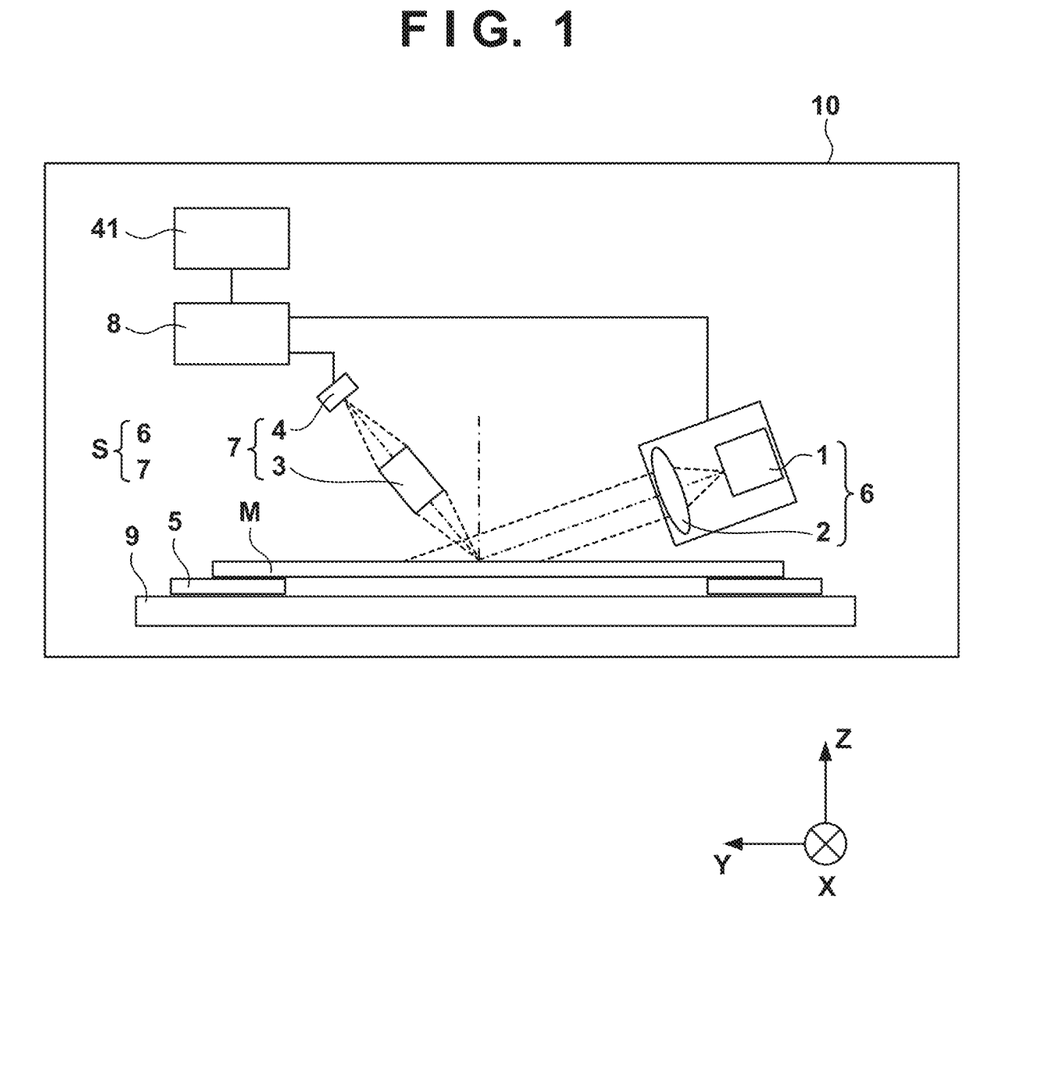
FIG. 1 is a view showing the arrangement of a foreign substance inspection apparatus according to an embodiment.
Figure 2A:
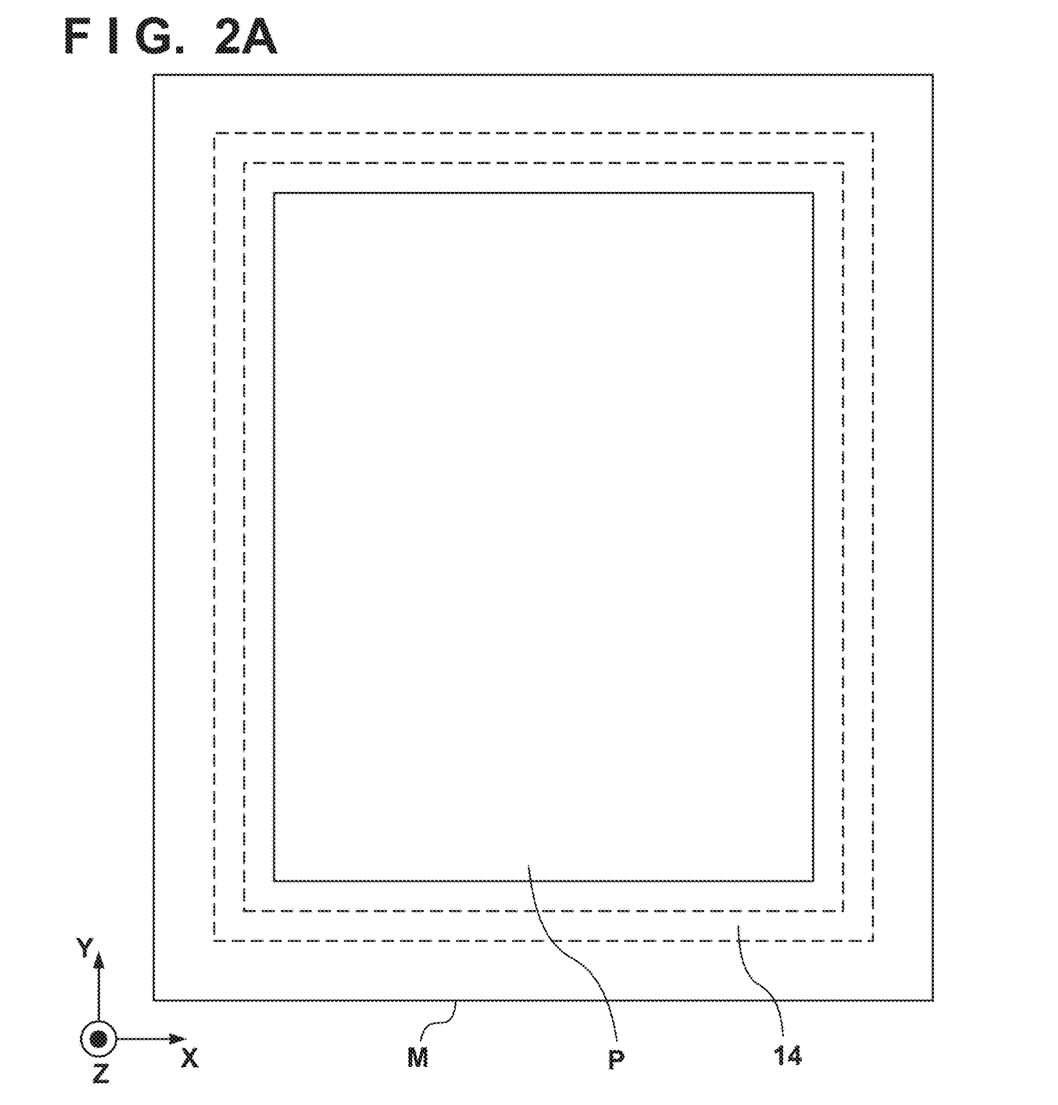
FIGS. 2A and 2B are views exemplifying an original as an inspected object.
Figure 2B:
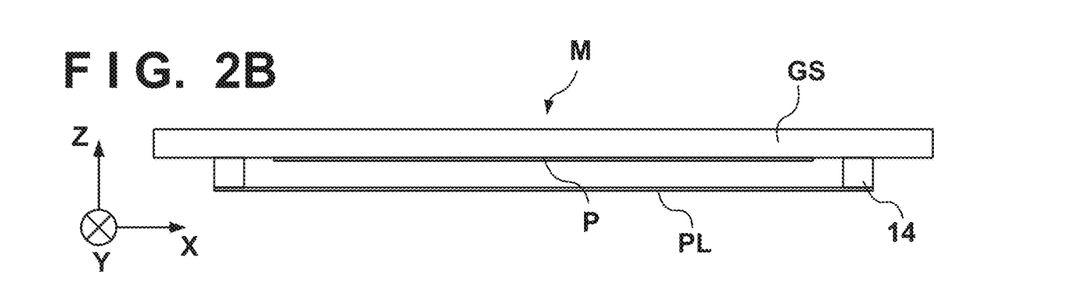
Figure 3:
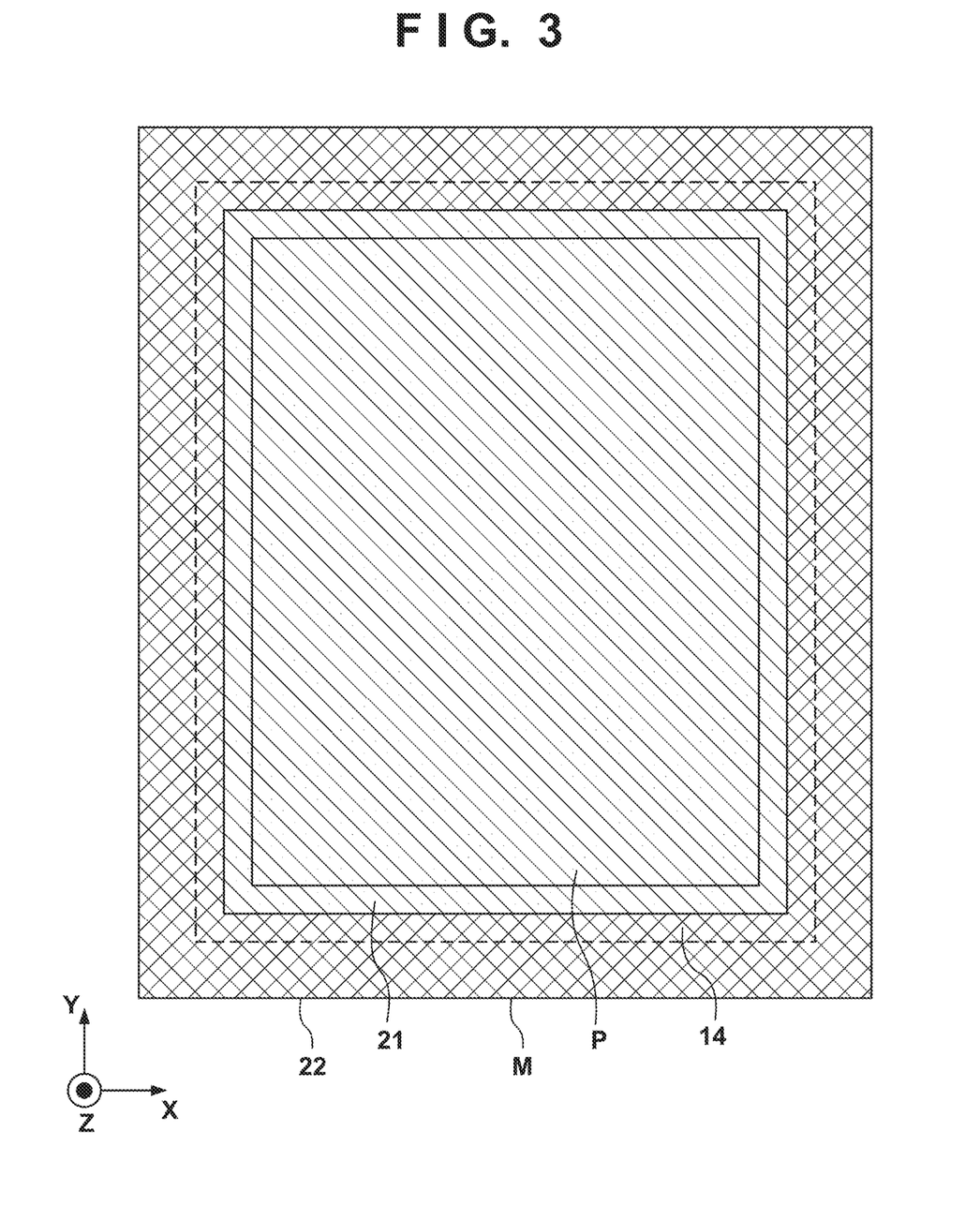
FIG. 3 is a view showing an inspection region and a non-inspection region arranged outside the inspection region of the original.

FIG. 1 shows the arrangement of a foreign substance inspection apparatus 10 according to an embodiment. FIG. 2A shows a plan view of an original M as an inspected object, and FIG. 2B shows a sectional view of the original M. FIG. 3 shows an inspection region 21 and a non-inspection region 22 arranged outside the inspection region of the original M. The inspection region 21 is a region where the presence/absence of a foreign substance is to be inspected, and the non-inspection region 22 is a region where the presence/absence of a foreign substance need not be inspected or is a region where the presence/absence of the foreign substance cannot be inspected due to the specifications of the foreign substance inspection apparatus 10. The original M can include, for example, a glass substrate GS, a pattern P (for example, a chrome pattern) provided on the glass substrate GS, a pellicle PL, and a pellicle frame 14 which is bonded to the glass substrate GS and supports the pellicle PL. The inspection region 21 can be a region inside the inner edge of the pellicle frame 14.

The foreign substance inspection apparatus 10 inspects the presence/absence of a foreign substance on the original M as an inspected object. The foreign substance inspection apparatus 10 can include a sensor S that illuminates a region (an image acquisition region 15 to be described later) including the inspection region 21, detects the light from this region, and outputs the detection result as an image (image data). An operation in which the sensor S generates and outputs an image in this manner will also be referred to as image capturing hereinafter. The foreign substance inspection apparatus 10 can further include a processor 8 that detects a foreign substance based on an inspection region image which is an image acquired by excluding anon-inspection region image, which is an image of the non-inspection region 22, from the image output from the sensor S. The non-inspection region image can include a first part which is generated by light from a predetermined part of the non-inspection region 22 of the original M and a second part whose pixel value is continuous from that of the first part. The processor 8 can recognize the first part based on a feature of the predetermined part. The processor 8 can specify the second part based on the fact that the pixel value is continuous from the pixel value of the first part. The non-inspection region 22 of the original M includes a pellicle frame 14 (frame-shaped portion), and the above-described predetermined part can be the corner portion of the pellicle frame 14 (frame-shaped portion). Alternatively, the above-described predetermined part can be a part that can be identified by a mark or the like provided on the pellicle frame 14.

The processor 8 can be formed from, for example, a PLD (the abbreviation of a Programmable Logic Device) such as an FPGA (the abbreviation of a Field Programmable Gate Array), an ASIC (the abbreviation of an Application Specific Integrated Circuit), a general-purpose computer embedded with a program, or a combination of all or some of these components.

Figure 5:
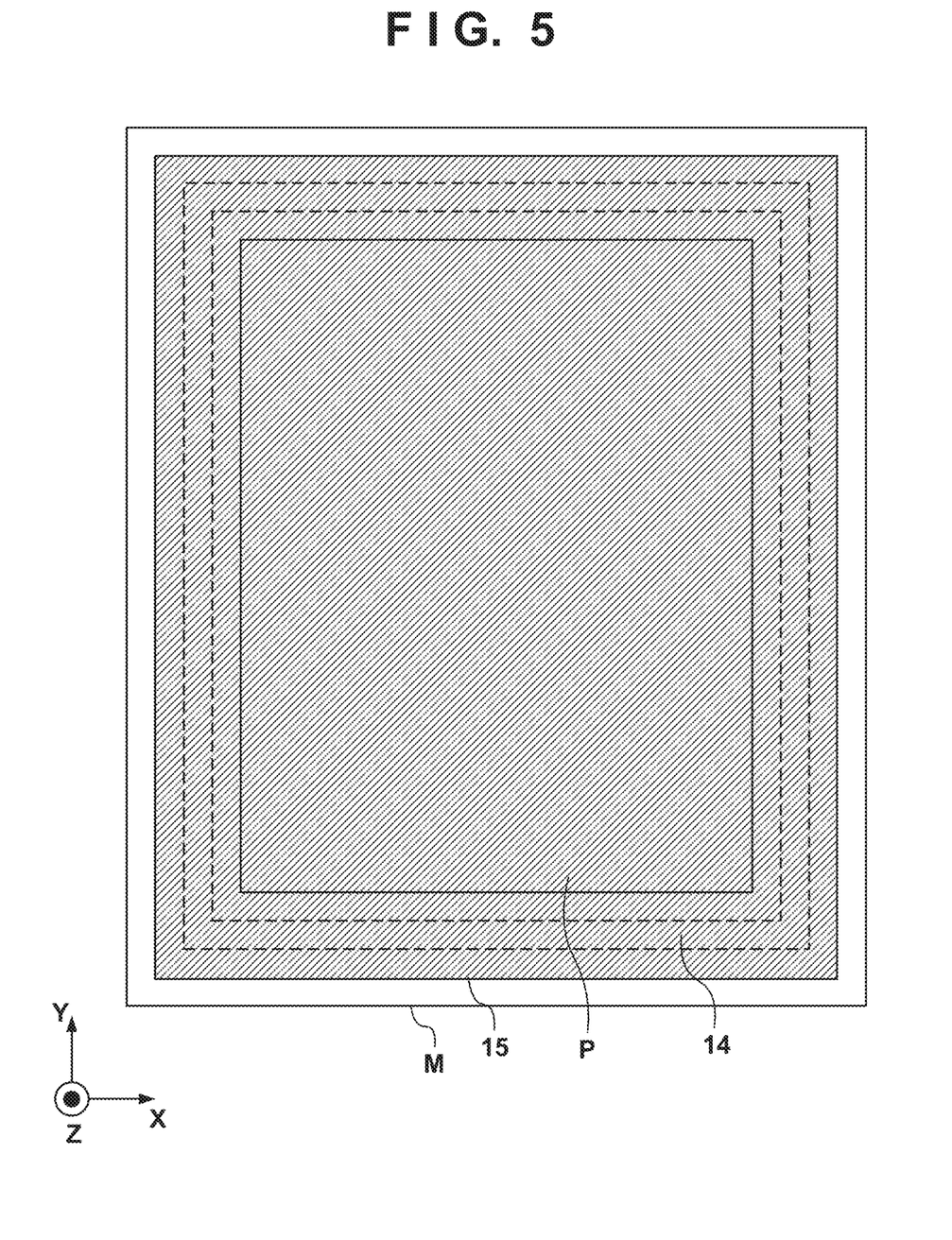
FIG. 5 is a view exemplifying an image acquisition region.

The sensor S can include a light irradiator 6 that irradiates the surface of the original M with light at a tilted angle with respect to the normal of the surface of the original M and a light detector 7 that detects the light (reflected light or scattered light) from a foreign substance on the surface. The light detector 7 is arranged so the specularly reflected light from the surface (region where the foreign substance is absent) of the original M will not enter the light detector 7. The light irradiator 6 can include a light source 1 and an optical system 2 for irradiating the original M with the light from the light source 1. The light detector 7 can include a photoelectric converter 4 (for example, a photomultiplier tube) and an optical system 3 for focusing the light from the foreign substance on the original M to the photoelectric converter 4. The sensor S is configured to output an image of the image acquisition region 15 which includes at least a part of the non-inspection region 22 other than the inspection region 21. The image acquisition region 15 is exemplified in FIG. 5. In the example shown in FIG. 5, the image acquisition region 15 is a region containing the inspection region 21 and the pellicle frame 14.

The foreign substance inspection apparatus 10 can further include an inspection stage 5 that holds the original M and a driving mechanism 9 that scans or drives the inspection stage 5 in a predetermined direction (Y direction). In one example, the light irradiator 6 can irradiate the original M with light so as to scan the original M in the X direction (main scanning direction), and the driving mechanism 9 can drive the original M so as to scan the original M in the Y direction (sub-scanning direction). In another example, the light irradiator 6 may be configured to irradiate the original M with belt-shaped light which has a width that can cover the width of the image acquisition region 15 in the X direction. The driving mechanism 9 may drive the sensor S in a predetermined direction instead of driving the original M.

Figure 6:
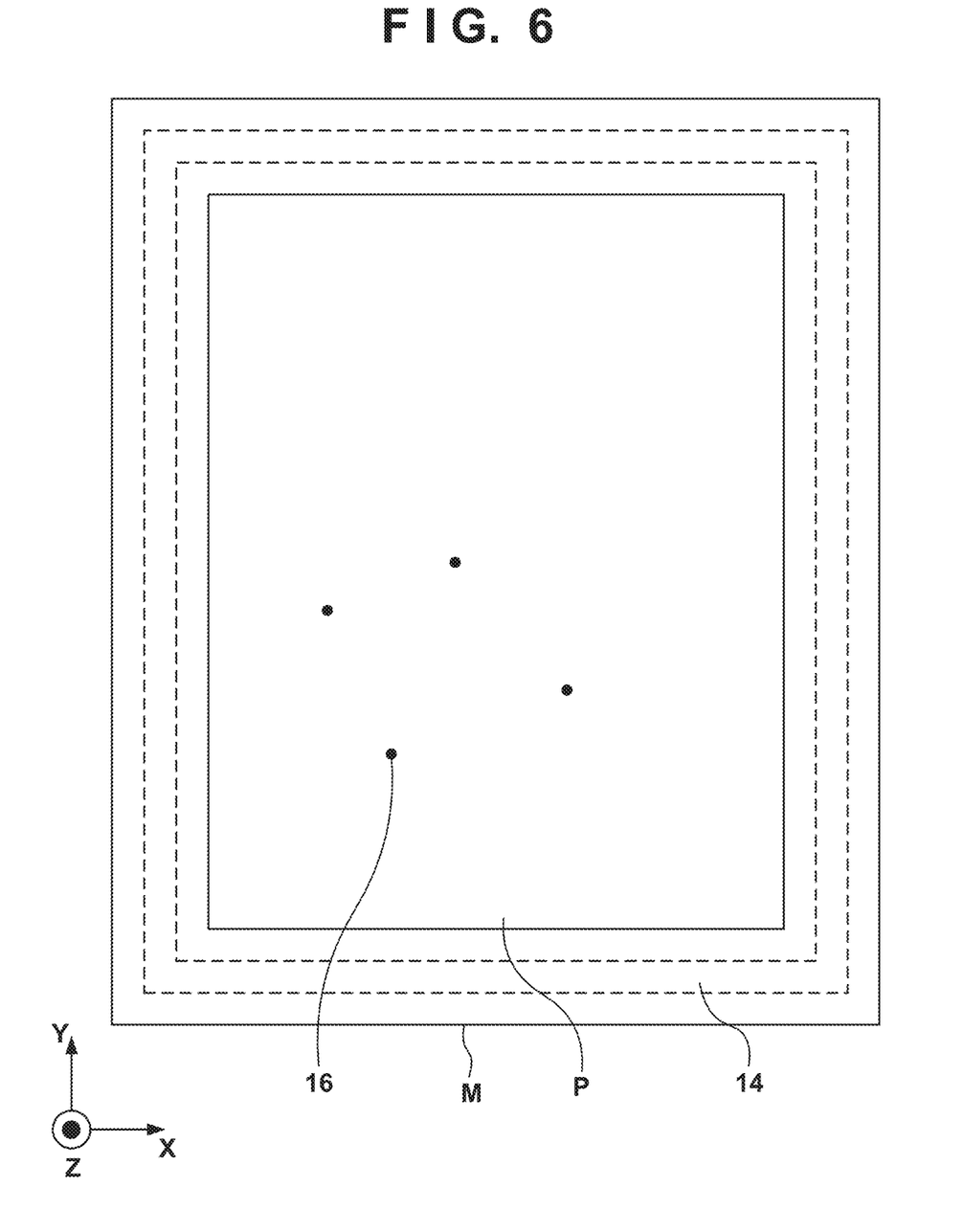
FIG. 6 is a view exemplifying an original to which a foreign substance has adhered.
Figure 7:
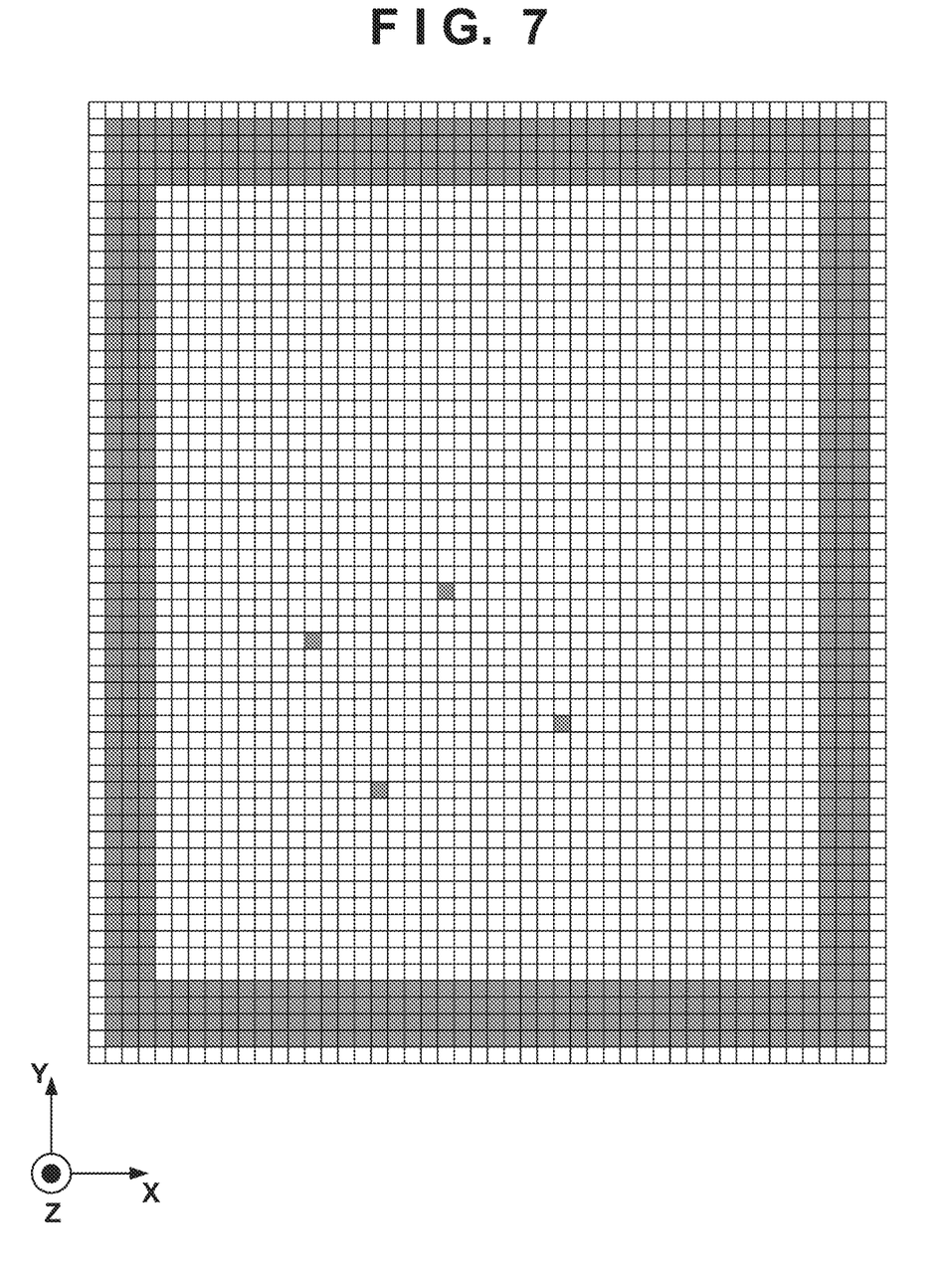
FIG. 7 is a view schematically showing an image acquired by using a sensor to capture the image acquisition region of the original.
Figure 8:
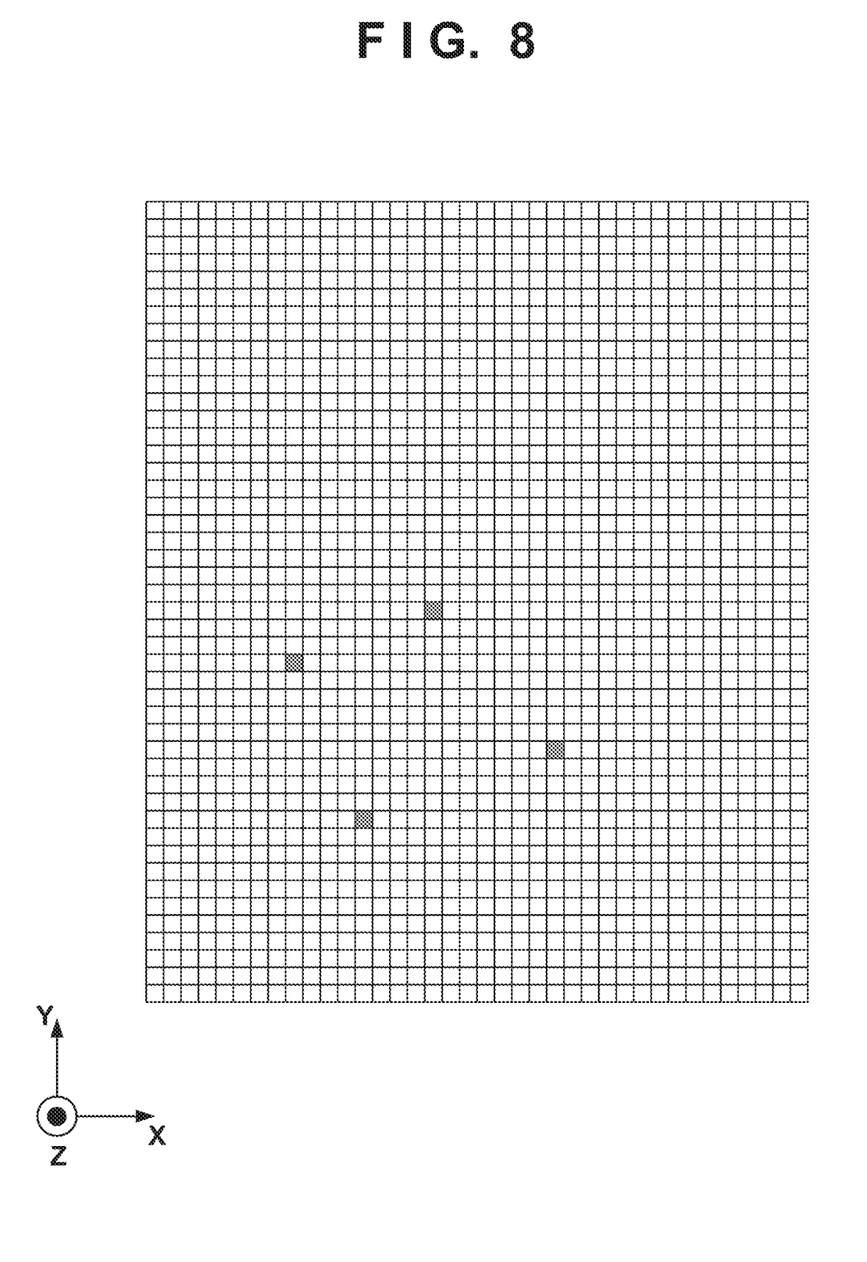
FIG. 8 is a view for exemplifying an image displayed on a display unit.

The foreign substance inspection apparatus 10 can further include a display unit 41. The processor 8 can control the display unit 41 to display an inspection region image. The processor 8 may also control the display unit 41 so that the foreign substance inspection result will be overlaid and displayed on the inspection region image. FIG. 6 schematically shows the original M to which foreign substances 16 have adhered. FIG. 7 schematically shows an image acquired by using the sensor S to capture the image acquisition region 15 of the original M shown in FIG. 6. FIG. 8 schematically shows an inspection result to be displayed on the display unit 41. The inspection result may be displayed as, for example, an image acquired by dividing the inspection region image into a plurality of unit regions and mapping the information (information indicating the presence/absence of a foreign substance) indicating the inspection result for each unit region. Each unit region can be arbitrarily set to be, for example, a 5-mm$^2$ region.

Figure 4A:
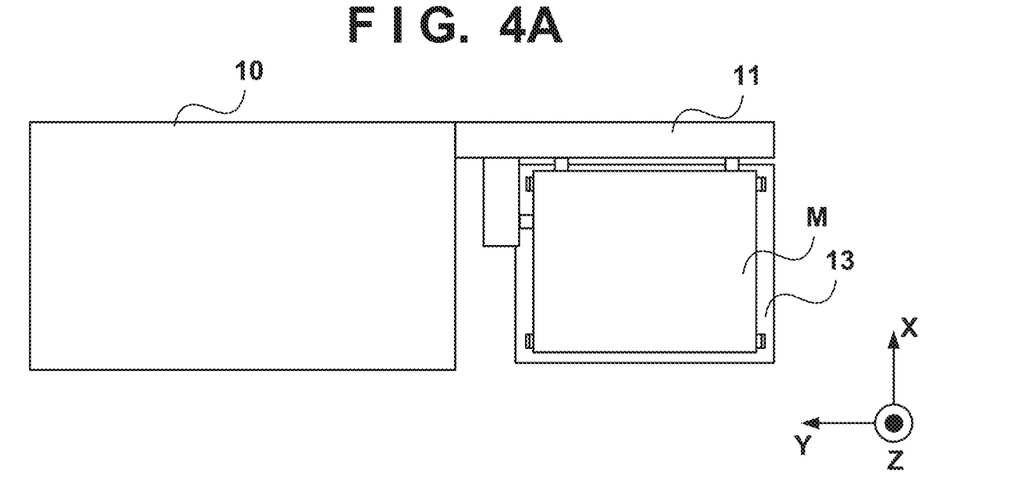
FIGS. 4A and 4B are views showing an example of the arrangement of the foreign substance inspection apparatus.
Figure 4B:
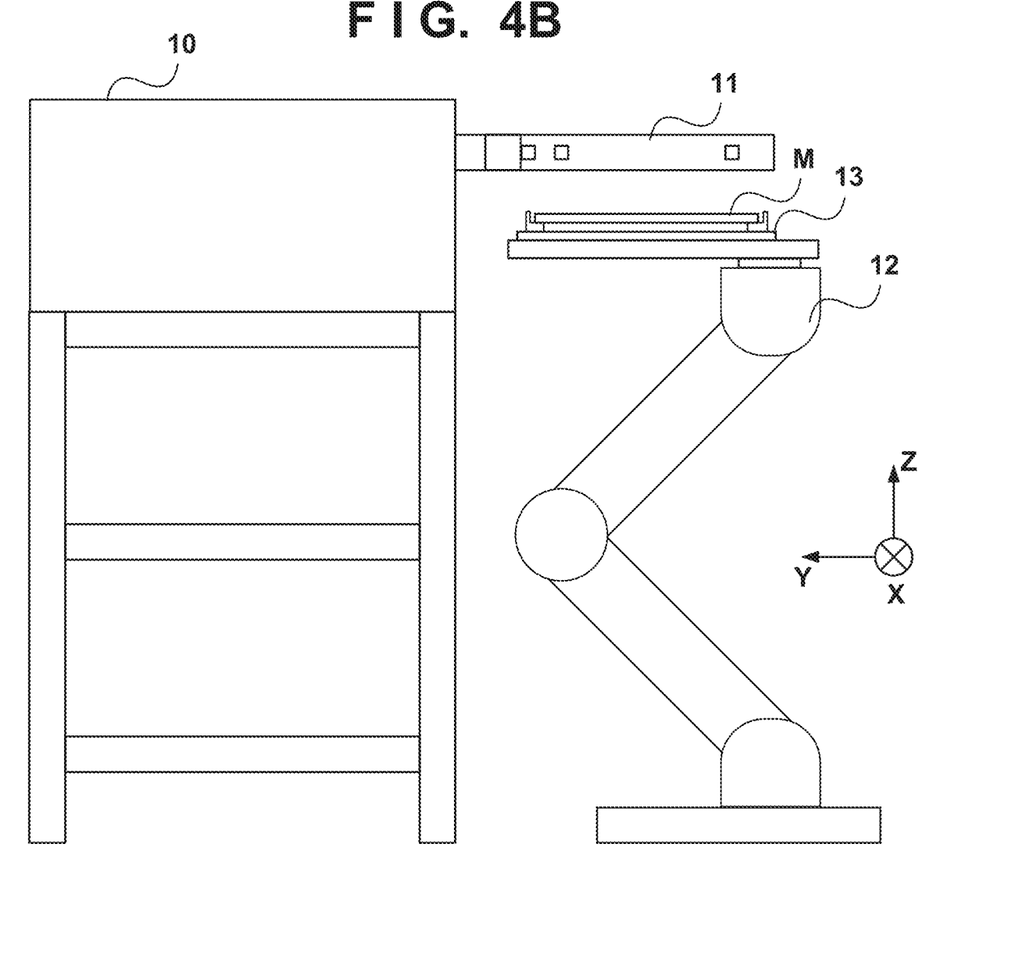

FIG. 4A shows a plan view of the foreign substance inspection apparatus 10, and FIG. 4B shows a side view of the foreign substance inspection apparatus 10. The original M can be loaded into the foreign substance inspection apparatus 10 by a conveyance robot 12. The conveyance robot 12 can be configured to convey the original M which is held by, for example, a cassette plate 13. The foreign substance inspection apparatus 10 can include an alignment mechanism 11 that aligns the original M with respect to the aforementioned inspection stage 5.

Figure 9:
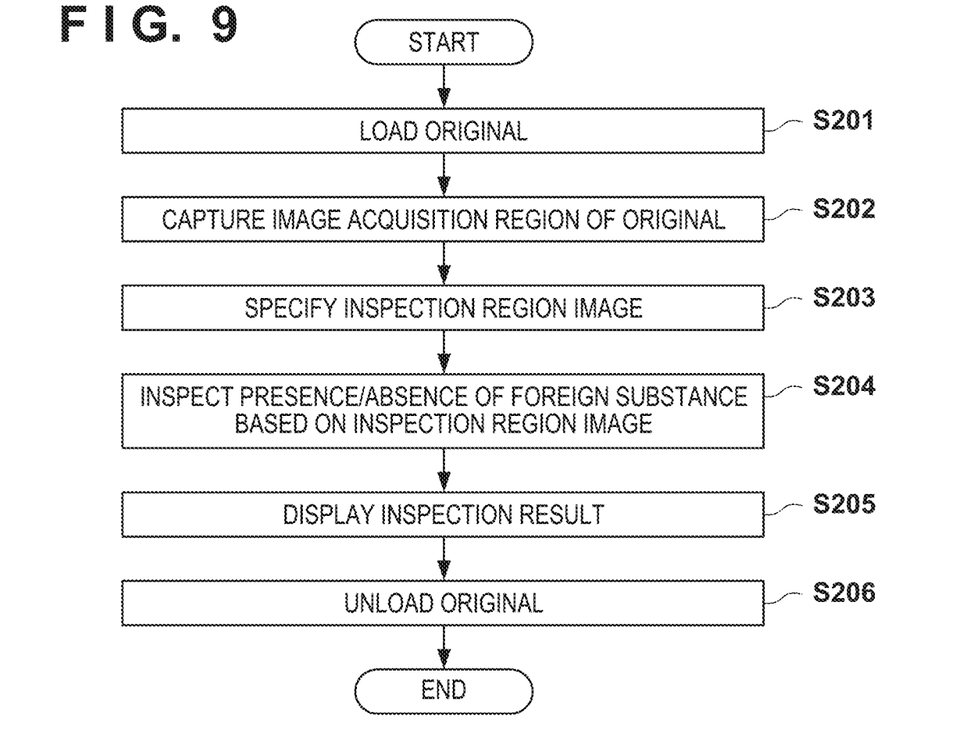
FIG. 9 is a flowchart exemplifying an operation of the foreign substance inspection apparatus.

FIG. 9 exemplifies the operation of the foreign substance inspection apparatus 10. The operation shown in FIG. 9 can be controlled by the processor 8. In step S201, the original M is loaded into the foreign substance inspection apparatus 10 by the conveyance robot 12, and is held by the inspection stage 5. Before the original M is loaded into the foreign substance inspection apparatus 10 by the conveyance robot 12, the conveyance robot 12 can use the alignment mechanism 11 to align the original M. Note that such an alignment operation can be performed by using another apparatus or mechanism or be performed in the foreign substance inspection apparatus 10. In step S202, the processor 8 causes the sensor S to capture the image acquisition region 15 of the original M and acquires an image output from the sensor S. In this case, in consideration of the alignment accuracy of the original M to be aligned on the inspection stage 5, the image acquisition region 15 can be set in advance so as to sufficiently ensure that the inspection region 21 of the original M will fall within the region to be captured by the sensor S. Hence, more strictly, the image acquisition region 15 can match a region to be captured by the sensor S in a state in which the original M has been accurately aligned without an error on the inspection stage 5.

In step S203, the processor 8 specifies an inspection region image acquired by excluding a non-inspection region image, which is an image of the non-inspection region 22, from the image acquired in step S202. The inspection region image corresponds to an image that includes the region shown in FIG. 8. The process of step S203 will be described in detail later.

In step S204, the processor 8 determines (or inspects) the presence/absence of a foreign substance based on the inspection region image specified in step S203. In this case, the processor 8 can determine that a foreign substance is present in the region corresponding to a pixel (or a unit region) forming the inspection region image if the pixel value of the pixel (or the unit region) is equal to or more than a predetermined value. In step S205, the processor 8 controls the display unit 41 to display the foreign substance inspection result. The processor 8 can control the display unit 41 so that the inspection result will be overlaid and displayed on the inspection region image in the manner of the example shown in FIG. 8. In step S206, the original M is unloaded from the foreign substance inspection apparatus 10 by the conveyance robot 12. If it is determined that a foreign substance is present in step S204, the original M that has been unloaded in step S206 can be conveyed to a cleaning apparatus for a cleaning process.

Figure 10:
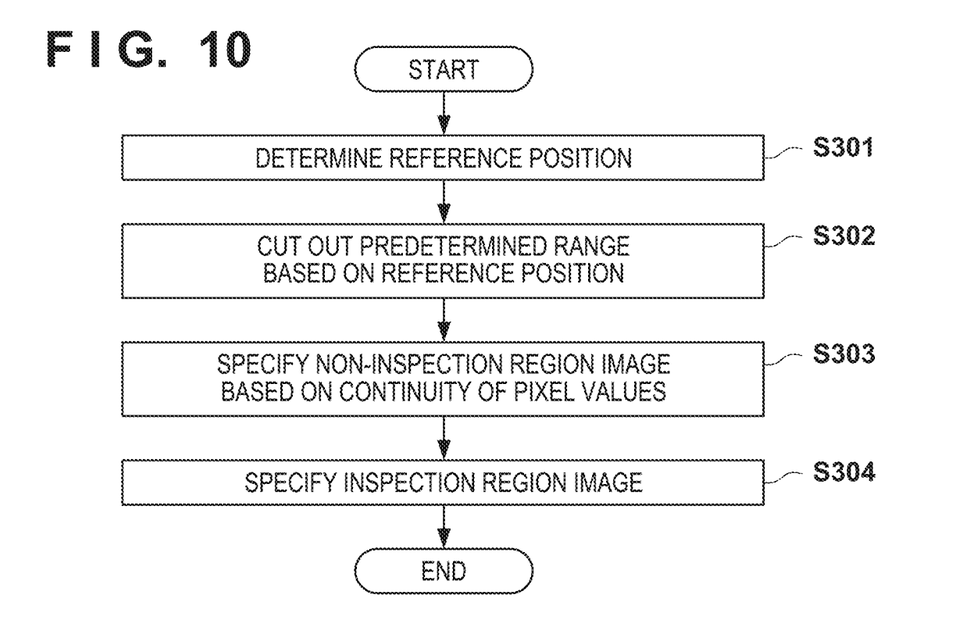
FIG. 10 is a flowchart exemplifying an operation of the foreign substance inspection apparatus.
Figure 11A:
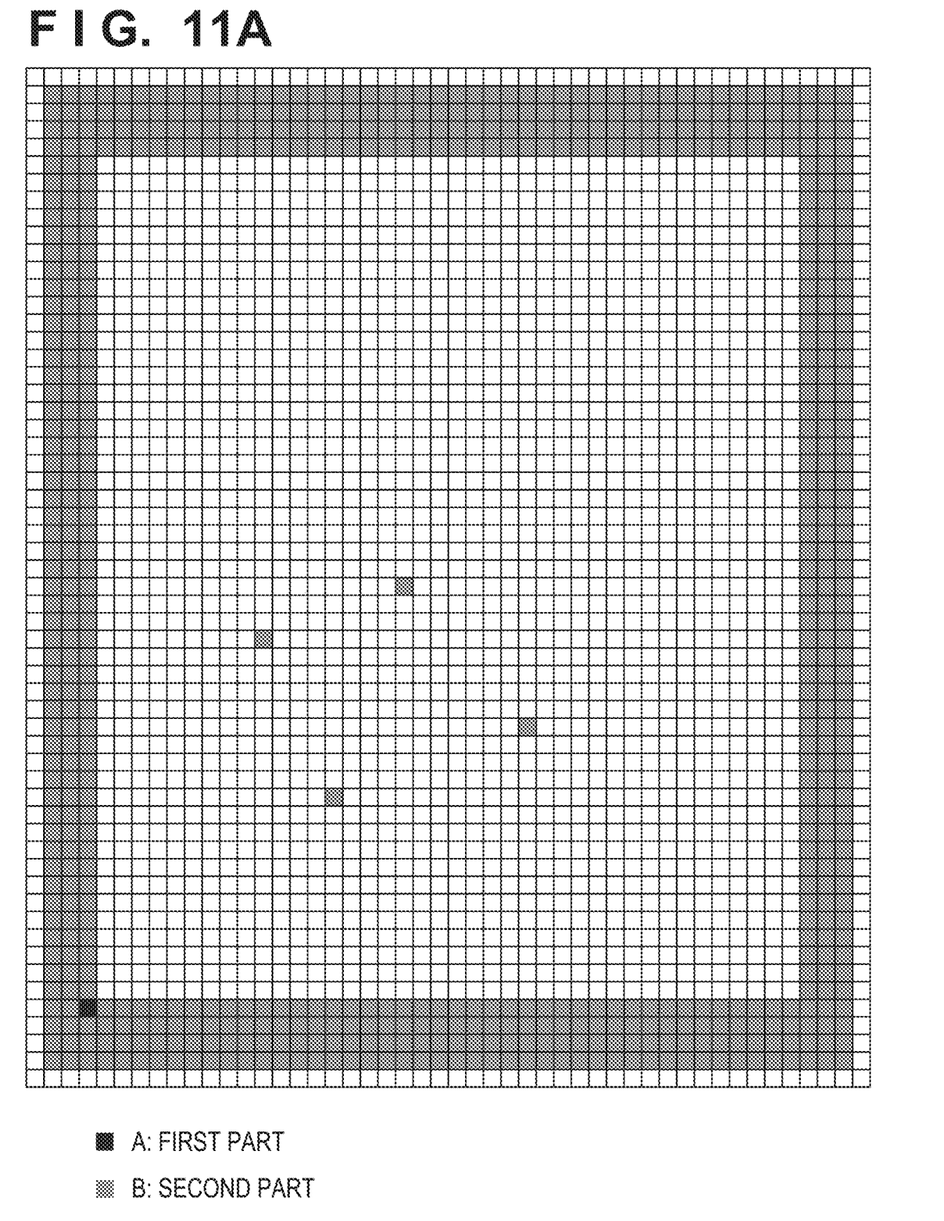
FIGS. 11A and 11B are views exemplifying an image acquired in step S202.

FIG. 10 shows a more specific example of the process of step S203 of FIG. 9. In step S301, the processor 8 determines a reference position in the image acquired in step S202. FIG. 11A shows an example of an image acquired in steps S202. In FIG. 11A, pixels (or unit regions) filled with black and pixels (or unit regions) filled with gray form a pellicle frame image which is formed by light from the pellicle frame 14 (frame-shaped portion) included in the non-inspection region 22 of the original M. The pellicle frame image can be a part of the non-inspection region image. In FIG. 11A, black and gray are not colors used to indicate the tones of the image, but are colors added for the sake of descriptive convenience. In addition, pixels (or unit regions) filled with black forms a first part A of the non-inspection region image. Each pixel (or each unit region) filled with gray forms a second part B which is a part different from the first part A of the non-inspection region image.

Figure 11B:
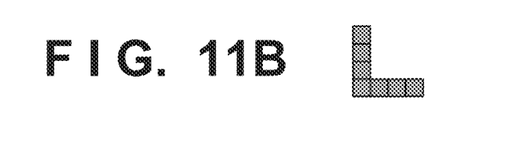

The processor 8 can determine a predetermined part (for example, the lower left corner portion), that is, the first part A in this example, as the reference position in the pellicle frame image (frame-shaped portion) formed by the light from the pellicle frame 14 included in the non-inspection region 22 of the original M. The detection of the predetermined part can be performed by template matching by using, for example, a template as shown in FIG. 11B. The predetermined part can be a part of an image that can be identified by a mark or the like. According to this embodiment, if the first part A is included in the image captured by the sensor S in step S202, the first part A can be specified. Subsequently, each second part B can be specified based on the continuity of pixel values from the specified first part A, a non-inspection region image can be specified based on the specification of each part B, and the inspection region image can be specified based on the non-inspection region image. Hence, compared to a case in which the outer edge of an inspection target region is set to be sufficiently apart from the inner edge of the pellicle frame 14, a foreign substance that has adhered to the original M can be detected over a wide range even if the alignment accuracy of the original M is low.

Figure 12:
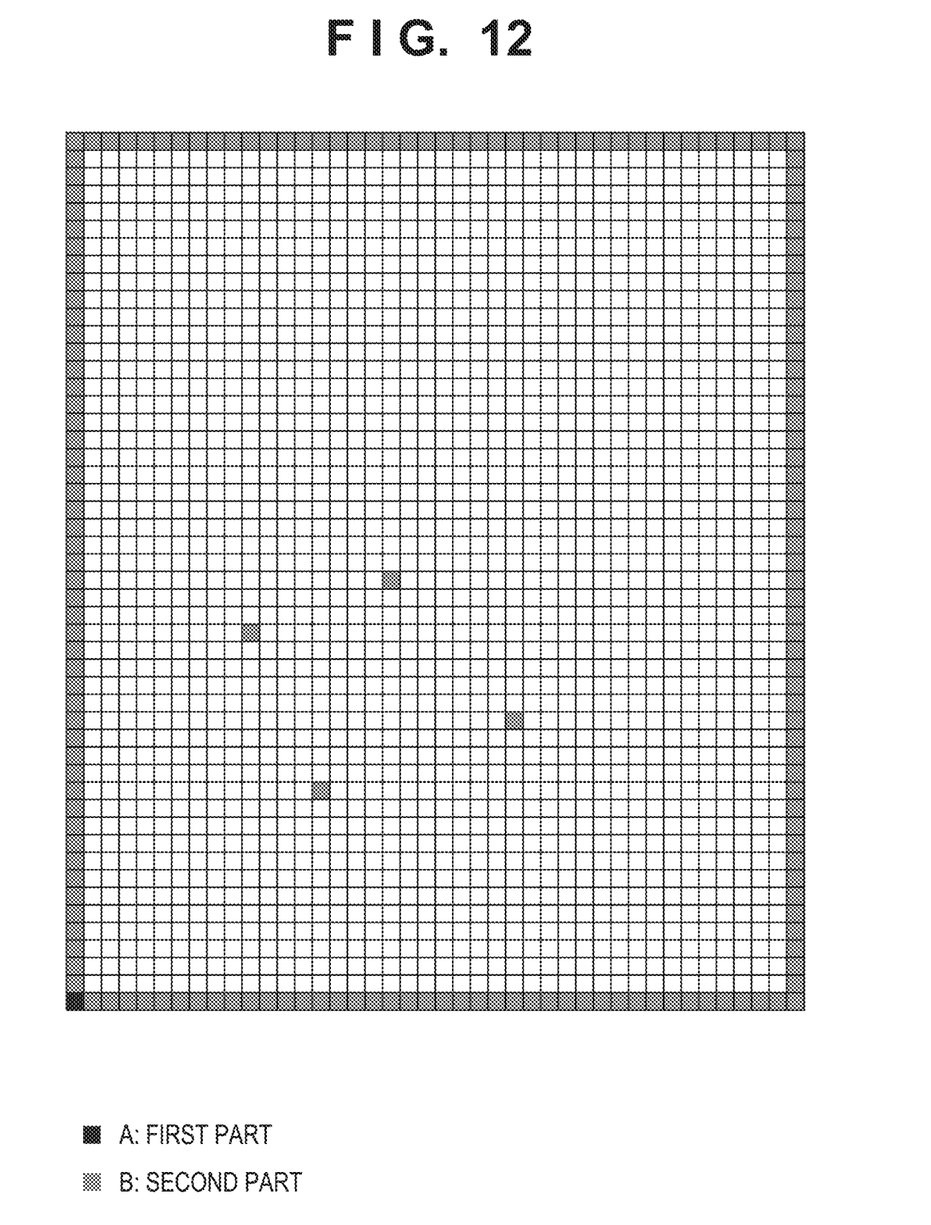
FIG. 12 is a view exemplifying an image to be cut out in step S302.

In step S302, the processor 8 cuts out, from the image acquired in step S202, a predetermined range based on the above-described reference position as a reference. FIG. 12 schematically shows an image to be cut out in step S302. The size of the predetermined range can be set in advance so as to ensure that the inspection region image will be included in this range, and can be set, for example, based on the length (for example, the pixel count) in the X direction and the length (for example, the pixel count) in the Y direction. The processing for cutting out a predetermined range from an image can be, for example, processing for specifying the predetermined range in the image.

In step S303, the processor 8 specifies the non-inspection region image based on the continuity of pixel values in the image that was cut out in step S302. More specifically, the processor 8 can specify each second part B based on the fact that the pixel value is continuous from the pixel value of the first part A. The first part A and second parts B are formed by pixels each having a pixel value which is equal to or more than a predetermined value. The processor 8 can determine that the pixel values of adjacent pixels have continuity if each adjacent pixel has a pixel value equal to or more than the predetermined value. Alternatively, the first part A and the second parts B can be formed by pixels each having a saturated pixel value, and the processor 8 can determine that the pixel values of adjacent pixels have continuity if each adjacent pixel has a saturated pixel value. The processes of steps S301 and S302 need not always be executed, and in a case in which steps S301 and S302 will not be executed, the first part A can be specified in step S301.

In step S304, the processor 8 can specify, as the inspection region image, an image acquired by excluding the non-inspection region image specified in step S303 from the image cut out in step S302. Alternatively, the processor 8 can specify, as the inspection region image, an image acquired by excluding a region closer to the outer side than the inner edge of the non-inspection region image specified in step S303 from the image acquired in step S202.

Among the originals M, there can be an original that has the pattern P on only a part (for example, half) of its entirety. To cope with such a case, the processor 8 can be arranged so that a user can designate only a part of the original M as an inspection target. For example, the processor 8 can be arranged so that the user can preset information indicating a region to be set as the inspection target. The processor 8 can extract an inspection target region from an inspection region image based on such preset information, and inspect the presence/absence of a foreign substance by targeting this inspection target region.

An inspected object is not limited to the original M and suffices to be an object in which a non-inspection region image can be specified based on the continuity of pixel values. An inspected object can be, for example, a unit for correcting an original by flattening the original.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-188863, filed Oct. 15, 2019, which is hereby incorporated by reference herein in its entirety.

What is claimed is:

1. A foreign substance inspection apparatus that inspects the presence/absence of a foreign substance on an inspected object which includes an inspection region and a non-inspection region arranged outside the inspection region, the apparatus comprising:
a sensor configured to illuminate the inspected object and output, as an image, a result acquired by detecting light from a region including the inspection region; and
a processor configured to detect a foreign substance based on an inspection region image acquired by excluding a non-inspection region image, which is an image of the non-inspection region, from the image output from the sensor,
wherein the non-inspection region image includes a first part generated by light from a predetermined part of the non-inspection region of the inspected object and a second part whose pixel value is continuous from a pixel value of the first part, and the processor specifies the second part based on a fact that the pixel value of the second part is continuous from the pixel value of the first part.

2. The apparatus according to claim 1, wherein the processor recognizes the first part based on a feature of the predetermined part.

3. The apparatus according to claim 2, wherein the non-inspection region includes a frame-shaped portion, and the predetermined part is a corner portion of the frame-shaped portion.

4. The apparatus according to claim 1, wherein the first part and the second part are formed by pixels each having a pixel value which not less than a predetermined value, and the processor determines that the pixel values of adjacent pixels have continuity in a case in which each of the adjacent pixels has a pixel value not less than a predetermined value.

5. The apparatus according to claim 1, wherein the first part and the second part are formed by pixels each having a saturated pixel value, and the processor determines that the pixel values of adjacent pixels have continuity in a case in which each of the adjacent pixels has a saturated pixel value.

6. The apparatus according to claim 1, wherein the sensor includes a light irradiator configured to irradiate a surface of the inspected object with light at a tilted angle with respect to a normal of the surface and a light detector configured to detect light from a foreign substance on the surface.

7. The apparatus according to claim 1, wherein the processor detects a foreign substance by setting, as an inspection target, an image extracted from the inspection region image based on preset information.

8. The apparatus according to claim 1, wherein the processor controls a display unit so as to display the inspection region image.

9. The apparatus according to claim 8, wherein the processor controls the display unit so that a foreign substance inspection result will be overlaid and displayed on the inspection region image.

10. A foreign substance inspection method for inspecting a foreign substance on an inspected object which includes an inspection region and a non-inspection region arranged outside the inspection region, the method comprising:
illuminating the inspected object and acquiring, as an image, a result acquired by detecting light from the inspection region; and
detecting a foreign substance based on an inspection region image acquired by excluding a non-inspection region image, which is an image of the non-inspection region, from the image acquired in the acquiring,
wherein the non-inspection region image includes a first part generated by light from a predetermined part of the non-inspection region of the inspected object and a second part whose pixel value is continuous from a pixel value of the first part, and the second part is recognized in the detecting based on a fact that the pixel value of the second part is continuous from the pixel value of the first part.

* * * * *